(12) United States Patent
Zaiss (10) Patent No.: US 11,084,209 B2
(45) Date of Patent: Aug. 10, 2021

(54) EXTRACTION DURING ADDITIVE MANUFACTURING

(71) Applicant: TRUMPF Laser- und Systemtechnik GmbH, Ditzingen (DE)

(72) Inventor: Joerg Zaiss, Eberdingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 16/866,003

(22) Filed: May 4, 2020

(65) Prior Publication Data

US 2020/0262140 A1 Aug. 20, 2020

Related U.S. Application Data

(63) Continuation of application No. PCT/EP2018/079750, filed on Oct. 30, 2018.

(30) Foreign Application Priority Data

Nov. 6, 2017 (DE) .......................... 102017125838.8

(51) Int. Cl.
  *B29C 64/153* (2017.01)
  *B29C 64/205* (2017.01)
  (Continued)

(52) U.S. Cl.
  CPC .......... *B29C 64/153* (2017.08); *B29C 64/205* (2017.08); *B29C 64/245* (2017.08);
  (Continued)

(58) Field of Classification Search
  CPC ... B29C 64/153; B29C 64/245; B29C 64/255; B29C 64/268; B29C 64/205;
  (Continued)

(56) References Cited

U.S. PATENT DOCUMENTS 4,246,013 A * 1/1981 Truhan .................. B01D 45/12
  209/717
4,391,613 A * 7/1983 Wilson .................. B01D 45/16
  209/710

(Continued)

FOREIGN PATENT DOCUMENTS

DE   10 2006 014 835 A1   10/2007
DE       202011002037 U1    6/2011
(Continued)

OTHER PUBLICATIONS

PCT International Preliminary Report on Patentability in International Appln. No. PCT/EP2018/079750, dated May 12, 2020, 18 pages (with English translation).

(Continued)

*Primary Examiner* — Nahida Sultana
(74) *Attorney, Agent, or Firm* — Fish & Richardson P.C.

(57) ABSTRACT

This disclosure provides collector elements for gas circuits of additive manufacturing systems for making 3D components from a powder. The collector elements include an intake duct portion having a strip-shaped inflow duct with an intake opening and a main body portion that includes a cylindrical cavity extending along the intake duct portion, the cavity being fluidly connected to the inflow duct with a step in the rounded wall that causes an increase in diameter from a first diameter of the cavity to a second, larger diameter. The collector element also includes a first gas discharging portion with a tube portion and a diameter adjusting portion that fluidly connects a first end of the cavity to the inner volume of the tube portion via a duct.

16 Claims, 5 Drawing Sheets

(51) Int. Cl.
  *B29C 64/245* (2017.01)
  *B29C 64/255* (2017.01)
  *B29C 64/268* (2017.01)
  *B29C 64/371* (2017.01)
  *B33Y 30/00* (2015.01)

(52) U.S. Cl.
  CPC .......... *B29C 64/255* (2017.08); *B29C 64/268* (2017.08); *B29C 64/371* (2017.08); *B33Y 30/00* (2014.12)

(58) Field of Classification Search
  CPC ....... B29C 64/371; B33Y 30/00; B33Y 40/00; Y02P 10/25; Y02P 10/20; B22F 2003/1056; B22F 2003/1059; B22F 3/1055; B04C 1/00; B04C 5/04; B01D 45/16; B01D 46/0046
  See application file for complete search history.

(56) References Cited

U.S. PATENT DOCUMENTS

| | | | | |
|---|---|---|---|---|
| 9,931,792 | B2* | 4/2018 | Shi | B29C 64/357 |
| 2007/0234906 | A1* | 10/2007 | DeMarco | B01D 46/2411 |
| | | | | 96/382 |
| 2007/0295209 | A1* | 12/2007 | Strauser | B04C 3/04 |
| | | | | 95/271 |
| 2015/0298397 | A1* | 10/2015 | Chen | B29C 64/357 |
| | | | | 209/12.2 |
| 2016/0067719 | A1* | 3/2016 | Fill | B04C 5/181 |
| | | | | 55/447 |
| 2016/0312698 | A1* | 10/2016 | Judd | B01D 45/08 |
| 2018/0043614 | A1* | 2/2018 | Greenfield | B29C 64/205 |
| 2019/0009282 | A1* | 1/2019 | Damkj | B01D 50/002 |
| 2019/0143410 | A1* | 5/2019 | Kawada | B33Y 50/02 |
| | | | | 425/78 |
| 2019/0270138 | A1 | 9/2019 | Bjorn et al. | |
| 2020/0094320 | A1* | 3/2020 | Krol | B29C 64/171 |
| 2020/0261975 | A1* | 8/2020 | Higashi | B22F 3/16 |

FOREIGN PATENT DOCUMENTS

| | | |
|---|---|---|
| DE | 10 2010 052 206 A1 | 5/2012 |
| DE | 202012 013121 U1 | 8/2015 |
| DE | 102015109846 A1 | 12/2016 |
| DE | 102015213165 A1 | 1/2017 |
| DE | 102016121490 | 5/2018 |
| EP | 1839781 A2 | 10/2007 |
| EP | 2357040 A2 | 8/2011 |
| EP | 2732890 A2 | 5/2014 |
| EP | 3023228 A1 | 5/2016 |
| EP | 3117904 A1 | 1/2017 |
| EP | 3231583 A1 | 10/2017 |
| WO | WO 2010/007394 A1 | 1/2010 |

OTHER PUBLICATIONS

PCT International Search Report and Written Opinion in International Appln. No. PCT/EP2018/079750, dated Feb. 21, 2019, 22 pages (with English translation).
DE Search Report in German Appln. No. 102017125838.8, dated Jun. 19, 2018, 3 pages (English translation).

* cited by examiner

ND ADDITIVE MANUFACTURING

EXTRACTION DURING ADDITIVE MANUFACTURING

CROSS REFERENCE TO RELATED APPLICATIONS

This application is a continuation of and claims priority under 35 U.S.C. § 120 from PCT Application No. PCT/EP2018/079750, filed on Oct. 30, 2018 which claims priority from German Application No. 10 2017 125 838.8, filed on Nov. 6, 2017. The entire contents of each of these priority applications are incorporated herein by reference.

TECHNICAL FIELD

The present disclosure relates to devices for laser-based additive manufacturing and, in particular, the extraction of gas from a processing area of additive manufacturing.

BACKGROUND

The laser-based additive manufacturing of, in particular, metallic or ceramic workpieces is based on the solidification of a powdered starting material by irradiation with laser light. This concept—also known as selective laser melting, powder bed fusion, or Laser Metal Fusion (LMF)—is used inter alia in machines for (metallic) 3D printing. An exemplary machine (hereafter in brief LMF machine) for the manufacture of three-dimensional products is disclosed in EP 2 732 890 A1. The advantage of additive manufacturing is generally a simple production of complex and individually producible parts. In particular, defined structures in the interior and/or force flow-optimized structures can be realized.

EP 3 023 228 A1 discloses a machine for the additive manufacturing of three-dimensional products on a platform, which provides a gas flow over the platform to remove, e.g., smoke from the interaction zone. Further gas circuit configurations are known from DE 10 2010 052 206 A1, DE 10 2006 014 835 A1, WO 2010/007394 A1, and EP 1 839 781 A2.

For machines for additive manufacturing, the homogeneity of a gas flow in the manufacturing chamber is of great importance for the manufacturing process. Inhomogeneities in the gas flow can, for example, lead to different values in the part properties with regard to mechanical properties, density, roughness, discoloration, etc.

In general, the extraction of smoke with swirl tubes is known from building services engineering, for example. It is also known to use swirl tubes to extract smoke from machine tools, such as laser cutting machines. However, it is common practice to collect and discharge particles (e.g., agglomerates or splashes) and the like separately. In addition, there is the intention to use pressure shocks in laser cutting, as a very high gas pressure is required in laser cutting to remove slag, for example.

SUMMARY

One aspect of this disclosure is based on the object of improving the extraction characteristics in the manufacturing chamber, for example, in the area of a building platform, as well as improving the in-coupling through a laser in-coupling window (protective glass). Furthermore, this disclosure is based on the object of improving the extraction performance during a manufacturing process or a cleaning process in such a way that even larger particles can be removed.

At least one of these objects is solved by a (gas) collector element of a gas circuit of a manufacturing device for additive manufacturing of a three-dimensional component from a powder as described herein and by a manufacturing device for additive manufacturing of a three-dimensional component from a powder as described herein.

In one aspect, the disclosure features a collector element of a gas circuit of a manufacturing device for additive manufacturing of a three-dimensional component from a powder. The collector element includes an intake duct portion having a strip-shaped inflow duct with an intake opening, the intake opening extending along a longitudinal axis. The collector element further includes a main body portion having a cylindrical cavity with a rounded wall, the cavity extending along the intake duct portion, the cavity being fluidly connected to the inflow duct such that a step is formed in the rounded wall causing an increase, e.g., a step increase or jump in diameter from a first diameter of the cavity to a second diameter greater than the first diameter. The collector element further includes a first gas discharge portion with a diameter adjusting portion and a tube portion, wherein the diameter adjusting portion fluidly connects a first end of the cavity in the direction of the longitudinal axis with the inner volume of the tube portion via a duct, and wherein in a transition region between the cavity and the duct in the region of the increase in diameter on the side of the first diameter, an inner wall surface of the main body portion transitions (in particular preferably essentially step-free) into an inner wall surface of the diameter adjusting portion, and in the region of the increase in diameter on the side of the second diameter, the inner wall surface of the main body portion transitions via an intermediate face into the inner wall surface of the diameter adjusting portion.

In a further aspect, the disclosure provides manufacturing devices for additive manufacturing of a three-dimensional component from a powder that include a manufacturing chamber providing a work surface, the manufacturing chamber including a building platform region and a powder reservoir region, a pushing device for transferring the powder from the powder reservoir region to the building platform region, and a gas circulation system for providing a surface flow, which flows over the work surface. The gas circulation system includes a collector element as described herein that is connected to a pump and is arranged on the work surface or that is fluidly connected to the manufacturing chamber via an intermediate element in such a way that the intake opening of the collector element at the corner of the building platform region and optionally of the powder reservoir region extracts (sucks) gas out of the manufacturing chamber.

In some embodiments of the collector element, the diameter adjusting portion can fluidly connect the first end of the cavity in the direction of the longitudinal axis with the inner volume of the tube portion via a duct tapering continuously, e.g., conically or approximately conically, in the direction of the tube portion and/or can be configured as a largely step-free fluid connection. The intermediate face can be a stepped surface connection from the inner wall surface of the main body portion to the inner wall surface of the diameter adjusting portion and the surface connection can be stepped, vertical, or at an angle, curved or straight. In particular, a transition region between the intermediate face and the inner wall surface of the main body portion and/or between the intermediate face and the inner wall surface of the diameter adjusting portion can be formed without edges or with a rounded edge.

In some embodiments of the collector element, the inner wall surface of the main body portion can directly, especially without edges, transition into an inner wall surface of the diameter adjusting portion. In some embodiments, the intake duct portion can have a top plate and a bottom plate, between which the intake duct is plate-shaped, and the intake opening can be configured as a linear, strip-shaped opening on one side of the intake duct.

In some embodiments of the collector element, in the region of the increase in diameter on the side of the second diameter, a step side surface may extend in a radial direction starting from the diameter increase first over the difference between the second diameter and the first diameter, which becomes narrower with increasing distance from the increase in diameter in the radial direction. Optionally, an edge of the transition of the step side surface to the diameter adjusting portion can be rounded. The intermediate face, especially the step side surface, can be configured to guide gas entering the cavity along the intermediate face to form a vortex flow. The intake duct portion can extend on the side of the increase in diameter with a curvature transverse to the longitudinal axis, and the curvature may cause an inflow of extracted gas tangentially to the inner wall of the main body portion in the area of the increase in diameter on the side of the second diameter, so that extracted gas is guided through the cavity and the duct into the tube portion with a swirl around the longitudinal axis. An inlet diameter of the duct may be equal to the first diameter on the side of the main body portion on both sides of the diameter increase and an outlet diameter of the duct may be equal to the diameter of the inner volume of the tube portion on the side of the tube portion.

In some embodiments, the collector element may also have a second gas discharge portion which, like the first gas discharge portion, has a correspondingly shaped diameter adjusting portion and a correspondingly shaped tube portion.

In some embodiments of the collector element, it also includes a protective glass through which, in particular, radiation from a beam source is irradiated to generate a beam for irradiating the powder in the building platform region for layer-by-layer manufacture of the component. In general, a (further) collector element can be arranged in the manufacturing chamber in such a way that the intake opening of this collector element is positioned at the edge of the protective glass for extracting gas out of the region of the protective glass or is fluidly connected via an intermediate element for extracting gas from the region of the protective glass.

The disclosed concepts in additive manufacturing are based on the use of a collector element, generally also known as a swirl tube, through which gas is extracted from the manufacturing chamber of an LMF machine. Swirl tubes have the advantage that a homogeneous suction flow can be created over the entire length of an inlet slit of the swirl tube. It was also recognized that the additional fast vortex flow (gas cyclone) formed in the swirl tube makes it possible to remove smoke and light particles as well as heavier particles from LMF manufacturing, such as powder or agglomerates of powder grains, if the swirl tube is configured accordingly. Due to the formed flow field in the swirl tube, no heavier particles accumulate there, so that they can be guided essentially completely to a filter unit of the gas system. This is mainly due to high flow velocities near the edges inside the swirl tube. This enables, for example, efficient recycling of powder and prevents contamination of a new type of powder introduced into the LMF machine, because after a change to the new type of powder, the manufacturing chamber and the gas circulation system can easily be cleared from the previous powder.

For this purpose, appropriately configured flow transitions between a swirl tube main body portion and associated discharge tubes (gas discharge tubes) are particularly helpful. For example, if the transition is made with conically tapered (conical) attachments at the (tube) ends of the main body portion, no or very little powder can settle. The latter, as mentioned, is particularly advantageous if the interior of an LMF manufacturing device has to be completely cleaned due to a change of material. It is important that no powder residues remain in the manufacturing device, especially in the gas circulation system, because such residues can contaminate a newly introduced powder type and disturb a subsequent powder recycling process.

The concepts disclosed herein generally allow a scalability of the swirl tube main body portion depending on the region to be extracted. A very high degree of homogeneity of the flow can be achieved even with suction (extraction) along long lines. In general, the concepts can be implemented in a wide range of the ratio between the diameter of the swirl tube (main body portion) and the length of the intake opening, whereby much more complex numerical calculations of the intake element are not necessary. A further advantage is based on the self-cleaning effect due to the high speed in the swirl tube. A self-cleaning effect occurs, for example, for steel powder with an average particle size of 50 µm (depending on the particle size distribution) at an air flow velocity of approx. 3 m/s. Furthermore, the geometry of the swirl tube can also be setup for velocities of up to approx. 8 m/s or up to approx. 10 m/s, so that sufficient velocities can also be ensured for materials with higher or lower density and/or particle size.

DETAILED DESCRIPTION

Aspects described herein are based, at least in part, on the realization that the use of a swirl tube in additive manufacturing can create homogeneous flow conditions close to the powder bed surface, generally on a surface to be extracted. An implementation of a swirl tube-based collector element can provide a uniform line suction if the length and radius of curvature are appropriately configured. This can be used, for example, along a back wall/partition wall of a manufacturing housing so that the work surface in the manufacturing chamber can be exhausted.

The applicant's as yet unpublished German patent application DE 10 2016 121 490.6, entitled, "Homogene Absaugung bei der generativen Fertigung" with filing date Nov. 10, 2016, describes, for example, a structure for a laminar flow flowing across the powder bed. In LMF production, homogeneously distributed velocities and extraction quantities are preferred not only on the inlet side, but also on the outlet side of the process gas flow. The velocity distribution can be solved by a special geometry of the collector element of the gas flow. In such a setup, for example, the collector element disclosed herein can be used.

The collector element is configured in such a way that a vortex inevitably forms inside, as the extracted gas entering the swirl tube is deflected along the curved wall before it exits at the end of the swirl tube. The vortex formation results in a linear area with a fast vortex-shaped flow around the center of the swirl tube, which changes into an axial flow towards the extraction ends. The speed of the vortex flow depends purely on the geometric conditions. In the main body portion of the swirl tube, these geometric aspects are constant. A linear region with high inlet velocity into the swirl tube and low partial pressure is created. The low pressure is very constant over the length of the linear inlet region (the ratio of lowest velocity to highest velocity can be greater than 0.95), so that very uniform extractions velocities can be formed in the region of the intake opening. For the formation of a laminar gas flow in a flat area, such a collector element is preferably combined with an inlet geometry that produces an equally constant inflow.

Figure 7:
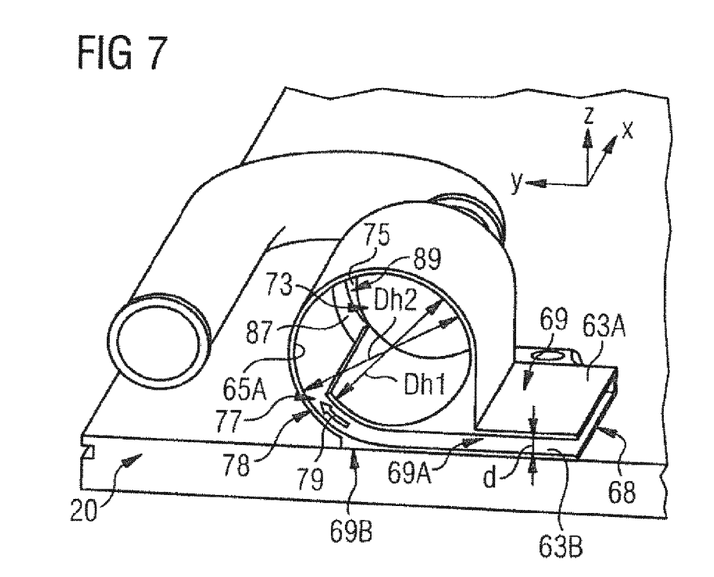
FIG. 7 is a perspective view of the swirl tube-based collector element of FIG. 5 in a sectional view parallel to the YZ plane in the border area.

The collector element proposed herein has a spiral cross-section in a main body portion as shown in FIG. 7. At an outer end of the spiral, there is, for example, a slit-shaped intake opening, e.g., provided with radii, as the inlet geometry. For example, one or more radii are possible to reduce the loss coefficients of the slit extraction or larger, funnel-shaped radii to adapt the cross-section of the outlet.

In some embodiments, truncated cones can be attached to one or both sides of the main body portion. The cone shape can largely avoid dead spaces (generally flow-free/flow-reduced areas) at transitions between the different portions of the wall, where powder residues could otherwise be deposited. The less powder remains in the collector element, the better a self-cleaning effect is implemented by the extraction flow.

In some embodiments, the spiral cross-section is implemented in the form of a true, three-dimensional helix shape of the main body portion. In addition, spiral or helix-like cross-sections of the swirl tube include, for example, two half-shells of two tubes with different diameters (radii of curvature) and generally several shell elements with different diameters (radii of curvature), which are assembled, if possible, with stepless transitions to form the main body portion.

The disclosed collector elements can be used at different places in LMF machines. For example, they can be provided above the work surface within the scope of a (homogeneous/laminar) gas flow close to the manufacturing process or for the protection of protective glasses, e.g., for lasers, sensors, process observation cameras against contamination from the side.

In various embodiments, the extraction can be done at one end of the main body portion or at both ends of the main body portion. In the case of a single-sided extraction system, inhomogeneity in the flow profile can be compensated for, e.g., by adjusting the cross-section of the intake opening. For example, a trapezoidal opening slot can be provided for the intake opening.

Figure 5:
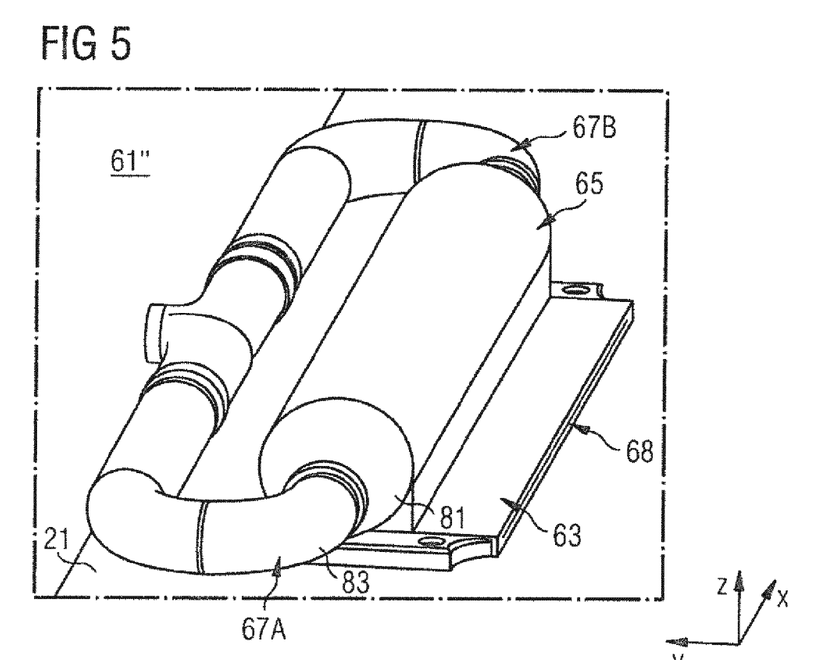
FIG. 5 is a perspective view of a swirl tube-based collector element.
Figure 6:
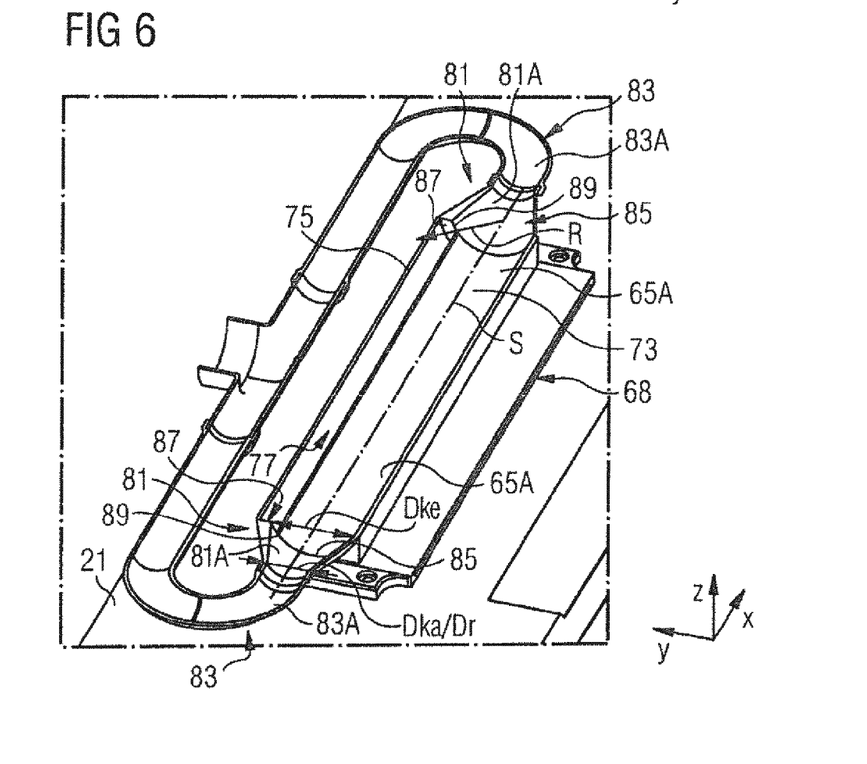
FIG. 6 is a perspective view of the swirl tube-based collector element of FIG. 5 in a sectional view parallel to the XY-plane centrally through the collector element.
Figure 8A:
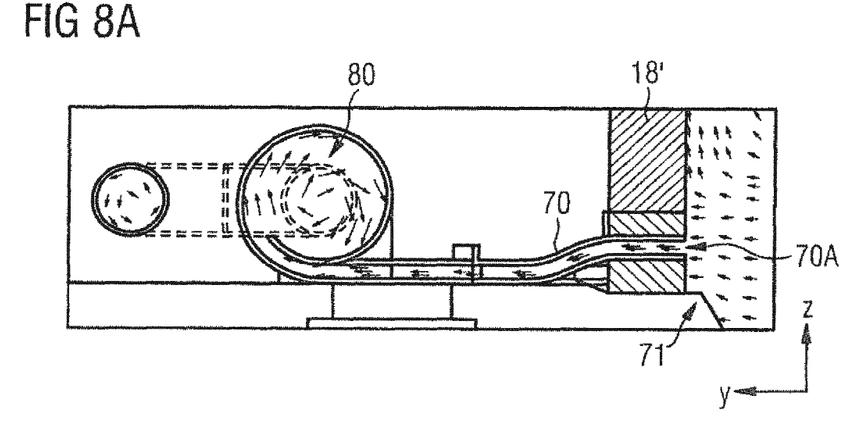
FIGS. 8A and 8B are schematics that illustrate an exemplary flow pattern in the region of the swirl tube-based collector element of FIG. 5.
Figure 8B:
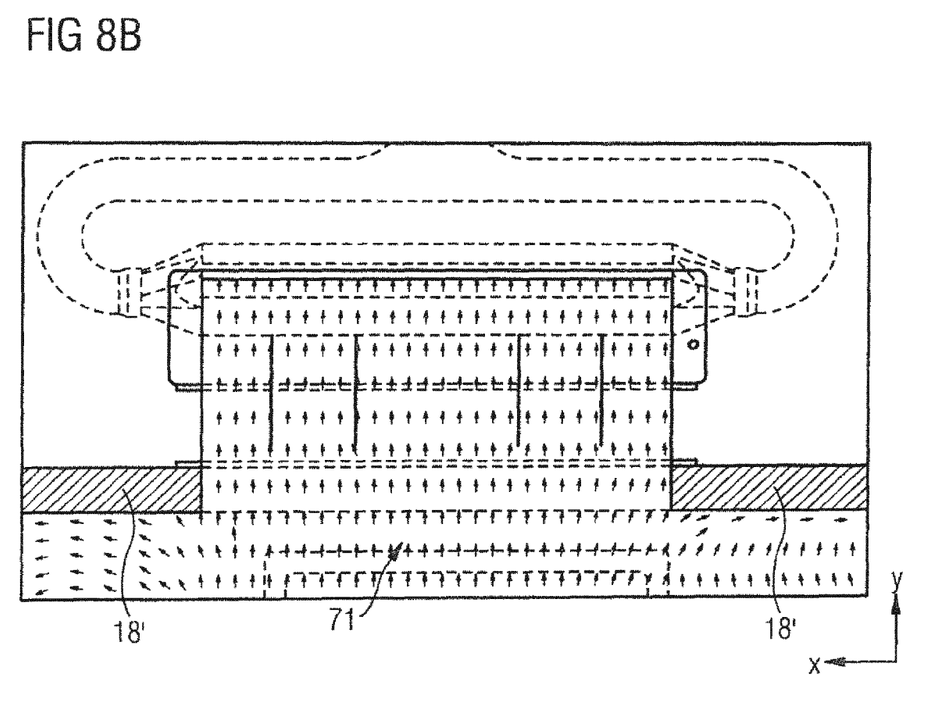

With reference to FIGS. 1 to 4, an embodiment of an LMF machine in which such a collector element is provided is explained below. FIGS. 5 to 7 show details of an example of a collector element for use in LMF machines. FIGS. 8A and 8B illustrate an example of a flow pattern in the area of the collector element.

FIGS. 1 to 4 show an example of an additive manufacturing device 1 for the production of a 3D component 3 from a powder 5. For the manufacturing process, please refer to EP 2 732 890 A2 mentioned above and incorporated herein by reference. The manufacturing device 1 includes a main housing 11, which provides a manufacturing chamber 13. A front wall 15 delimits the manufacturing chamber 13 on the front side. The main housing 11 also has a rear wall 18, side walls 16A, 16B, and a ceiling, which together define the manufacturing chamber 13. The front wall 15 has a front frame 15A with an opening 17 through which access is provided to the manufacturing chamber 13 of the manufacturing device 1. The opening 17 can be closed during the manufacturing process by a door 31 (handle 31A, lock 31B) attached to the front wall 15, for example (see FIG. 2). When the door 31 is open, there is access to the manufacturing chamber 13 of the manufacturing device 1 (see FIG. 1) and an operator can, for example, carry out the necessary preparatory steps such as cleaning the manufacturing chamber 13, refilling the powder reservoir, changing the type of powder, and remove the finished component 3.

Figure 1:
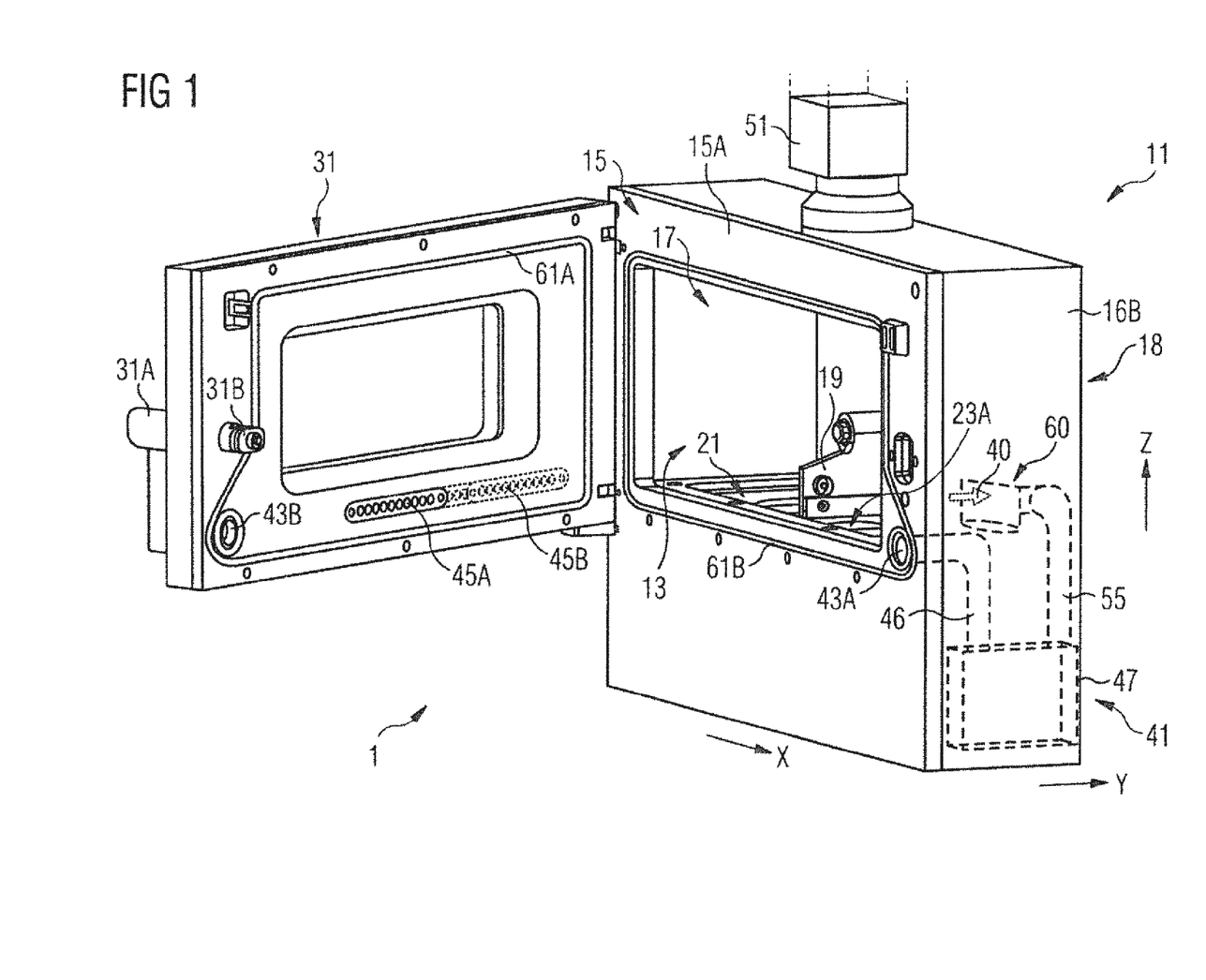
FIG. 1 is a schematic spatial representation of an exemplary additive manufacturing device.

FIG. 1 also shows a pusher 19 (herein also called a wiper) for distributing the powder 5 during the manufacturing process. The manufacturing process takes place on a work surface 21 of a work plate 20, which forms the floor of the manufacturing chamber 13. The work surface 21 has a building platform region 23A, a powder reservoir region 23B, and (optionally) a powder collection region 23C. The building platform region 23A can be provided centrally with respect to the opening 17. The irradiation process for the manufacturing of the 3D component 3 takes place in this region. The powder reservoir region 23B is used to provide fresh powder 5A, which is transferred to the building platform region 23A with the pusher 19 for the layer-by-layer manufacturing of the 3D component 3.

Figure 2:
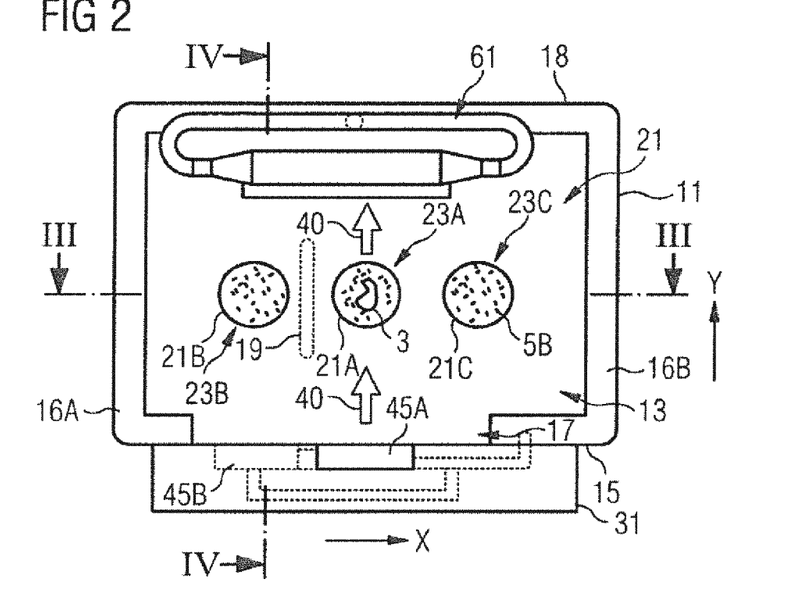
FIG. 2 is a schematic sectional view of the additive manufacturing device of FIG. 1 parallel to the XY plane through the manufacturing chamber.
Figure 3:
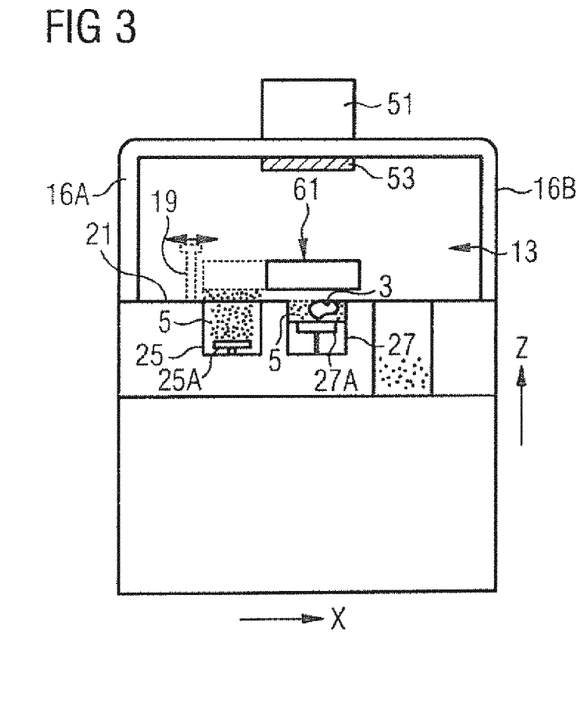
FIG. 3 is a schematic sectional view of the additive manufacturing device of FIG. 1 parallel to the XZ plane through the manufacturing chamber as indicated in FIG. 2.
Figure 4:
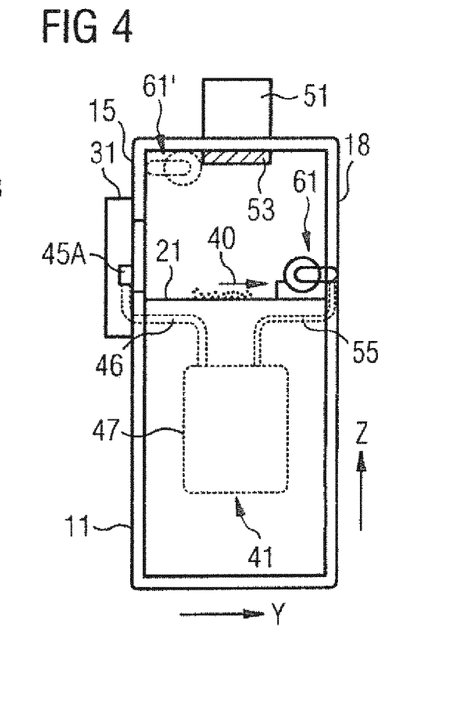
FIG. 4 is a schematic sectional view of the additive manufacturing device of FIG. 1 parallel to the YZ plane through the manufacturing chamber as indicated in FIG. 2.

As shown in FIGS. 2 to 4, the building platform region 23A is located in the X-direction (i.e., with respect to opening 17 in the transverse direction) between the powder reservoir region 23B and the powder collection region 23C. The powder reservoir region 23B has an, e.g., cylindrical powder storage container 25, the upper end of which opens into a (powder) supply opening 21B of the work surface 21. With the aid of a stamp 25A, metallic or ceramic powder 5, for example, can be gradually lifted from the powder storage container 25 to above the work surface 21. If a new powder layer is required for irradiation, fresh powder protruding beyond the work surface 21 can be moved laterally in the X-direction into building platform region 23A using the pusher 19. Accordingly, the pusher 19 in FIG. 2 extends in the Y-direction, which is orthogonal to the transverse direction (X-direction) in work surface 21.

The building platform region 23A has an, e.g., cylindrical, building cylinder 27 with a lowerable stamp 27A providing a platform for the formation of a powder bed. The lowering creates a component-powder region limited by the platform, which is connected to the building platform region 23A through the (irradiation) opening 21A in the work surface 21. If a layer of component 3 has been formed by fusing powder 5, the stamp 27A is lowered so that a recess limited by the irradiation opening 21A is formed in the work surface 21, into which the fresh powder can be moved with the pusher 19, so that a new upper powder layer is formed in the powder bed to be irradiated. Powder not required for building up the new layer can be moved with the pusher 19 through an opening 21C of the work surface 21 in the powder collection region 23C, e.g., for recycling in a collection container.

The main housing 11 also contains at least parts of a gas circulation system 41, such as a shielding gas tank and/or a shielding gas port, and a pump system (not shown) as well as a filter unit 47. The gas circulation system 41 allows to flood the manufacturing chamber 13 with, e.g., inert gas, such as argon or nitrogen, during the manufacturing process. In addition, manufacturing chamber 13 can be cleaned during a change of powder.

An irradiation system 51 can be mounted on the main housing 11, e.g., above the building platform region 23A. The irradiation system 51 is configured to generate radiation, e.g., laser light, which can fuse the powder 5 to form material layers of the component 3. It is based, for example, on a fiber or disk laser system. Alternatively, laser light from such a source can be guided to the main housing 11. The main housing 11 has a scanner system that can guide the radiation in a path in the building platform region 23A, which is matched to the component 3, to melt the uppermost powder layer of the powder bed locally. In an area of the ceiling of the main housing 11, through which the radiation enters the manufacturing space, a protective glass 53 may be provided to protect optical elements of the, e.g., scanner system from contamination.

The gas circulation system 41, for example, is configured in such a way that a surface flow 40 of the shielding gas is directed over/onto the opening 21B of the work surface 21 and thus over/onto the uppermost powder layer of the powder storage container 25. The shielding gas is preferably "dried," e.g., it has a moisture content of less than approx. 0.0005 g/l. Examples of dryable shielding gases are argon and nitrogen. The drying of the shielding gas can be done by passing the shielding gas through or over a drying medium/drying agent (e.g., anhydrone from LECO) in the gas circulation system 41.

In the embodiment shown, the surface flow 40 forms essentially transversely to the direction in which the openings 21A, 21B are arranged (here the X-direction), i.e., it flows correspondingly in the Y-direction over the opening 21A in the work surface 21.

An example of an implementation of the desired flow pattern in the manufacturing chamber 13 is shown in FIGS. 9A to 9D and can be achieved in particular with a (gas) collector element 61, as shown schematically in FIGS. 5 to 8. The flow pattern is also configured for the extraction of smoke, splashes, agglomerates, etc. The surface flow 40 flows exemplarily from door 31 to the rear wall 18 over the building platform region 23A. Here, soot is representative of the smallest particles that can be produced when laser light, for example, interacts with the powder. In order to prevent the manufacturing process from being influenced by, for example, the aforementioned deposits of soot on optics or the quality of the component from being affected by deposits of soot on the component itself, these tiny particles are transported out of the interaction area by a suitably configured flow and sucked away by the collector element.

The gas circulation system 41 includes a main housing portion, for example, located below and behind at the manufacturing chamber 13, and a door portion 41B integrated into the door 31. The main housing portion 41A includes, e.g., the shielding gas tank and/or the shielding gas port to an external shielding gas source, the pump system, the collector element 61, and the filter unit 47 of the gas circulation system 41.

The filter unit 47 is in fluid connection with the collector element 61 in the rear wall 18 via a pipe 55. The collector element 61 is mounted, for example, in a central area of the rear wall 18 on the work surface 21. In some embodiments, the collector element 61 is located in a rear area of the manufacturing chamber 13, which is separated from the manufacturing area by a partition wall, for example (see, for example, the partition wall 18' schematically indicated in FIGS. 8A and 8B).

The gas circulation system can be configured in such a way that at least those portions of the ducting system that guide a powder-loaded gas stream form a flow path that is as smooth as possible and rounded off with radii. This is implemented in the collector element 61 and the supply duct from manufacturing chamber 13 to the collector element 61 and the re-guiding from the collector element 61 to the filter unit 47.

Furthermore, the filter unit 47 is in fluid connection with an outlet structure 45A in the door 31. For this purpose, the main housing portion 41A of the gas circulation system 41 includes a pipe 46 to the front wall 15, which ends into a (housing) connection opening 43A in an area covered by the door 31. When the door 31 is closed, the connection opening 43A is in fluid connection with the door portion 41B of the gas circuit system 41 via a (door) connection opening 43B.

Accordingly, door portion 41B includes the outlet opening structure 45A for the gas that is to flow through the opening 21A as a soot removal stream and optionally additionally another outlet opening structure 45B for the gas that is to flow through the supply opening 21B as a drying stream. Further, the door portion 41B includes the supply port 45A and one or more connecting ducts from the supply port 45A to the outlet port structures 45A, 45B. Some embodiments may also include, for example, switchable valves or multiple ports to control the flow of the shielding gas from the 45A, 45B outlet port structures. In addition, the outlet orifice structure 45A and/or the collector element 61 may be configured in such a way that the flow pattern is as laminar as possible (directed across the orifice 21A) and as close as possible to the work surface 21.

FIGS. 2 to 4 show schematic examples of positions in the main housing 11 for the collector element 61, 61'. Thus, for example, it can be provided close to the work surface 21 (in FIGS. 2 to 3, for example, close to the rear wall 18)— collector element 61—or on the ceiling close to protective glass 26—collector element 61'—for linear extraction.

FIGS. 5 to 7 show several perspective (sectional) views of a swirl tube-based collector element 61", as it can be inserted into a gas circuit of a manufacturing device for additive manufacturing, for example in a manufacturing device 1, as described in connection with FIGS. 1 to 4.

The collector element 61" has an intake portion 63, a main body portion 65 and first and second gas discharge portions 67A, 67B. The intake duct portion 63 forms a slit-shaped inflow duct 69 (see FIG. 7), which can be arranged, for example, just above the work surface 21 (or close to the protective glass 53).

Alternatively, these regions can be fluidly connected with supply ducts to the inflow duct 69, as shown in FIG. 8A with an intermediate element 70. The intermediate element 70 has an intermediate element inlet opening 70A arranged above the work surface 21 and forms a smooth, rounded S-shaped flow path, which is adapted in cross-section to the cross-section of the inflow duct 69 and preferably extends it without steps.

With regard to the flow path of the collector element 61", the extraction into the inflow duct 69 on one side of the collector element 61" is effected through an intake opening 68 in the Y-direction. The intake opening 68 extends linearly along a longitudinal axis, which is aligned in the X direction as shown in FIG. 2. The height of the intake opening 68 extends correspondingly in the Z-direction.

As shown in the sectional views of the example of collector element 61" of FIG. 7 and FIG. 8, the intake duct portion 63 includes a flat top plate 63A and a flat bottom plate 63B, between which a plate-shaped portion 69A of the inflow duct 69 is located. The base plate 63B of the intake duct portion 63 is configured, for example, as a mounting plate for fixing to the work plate 20. It can, for example, be screwed onto the worktop.

In FIGS. 8A and 8B, an essentially laminar flow pattern can be seen in the suction area 71 in front of the intake opening 68, which continues in the inflow duct 69.

The inflow duct 69 continues on the side of the main body portion 65 in a portion 69B of the inflow duct 69 curved transversely to the longitudinal axis X. The curvature is selected, for example, in such a way that extracted gas from the inflow duct 69 flows tangentially into an essentially cylindrical-shaped cavity 73 of the main body portion 65.

The cylinder-like cavity 73 is correspondingly radially delimited by a rounded wall 75. The cavity 73 extends (axially) along the intake duct portion 63 and is fluid-connected to the inflow duct 69. The fluid connection is made through an inner, also linearly in the X-direction formed slit-shaped opening 77. The opening 77 is formed by a step 78 in the otherwise azimuthally continuous wall 75. The step 78 is formed by an increase in diameter from a first diameter Dh1 of the cavity 73 to a second diameter Dh2, which is larger than the first diameter Dh1.

In the sectional view of FIG. 7, it can be seen that a thickness d of the inflow duct 69 in the direction of flow is essentially constant both in the plate-shaped portion 69A and in the curved portion 69B. The curved portion 69B is configured in such a way that in the area of the increase in diameter on the side of the second diameter Dh2 an inflow of extracted gas is caused into the cavity 73 tangentially to the inner wall surface 65A of the main body portion 65 (indicated in FIG. 7 by an arrow 79).

Accordingly, a vortex flow 80 forms in the cavity 73 of the main body portion 65, as schematically indicated by arrows in FIGS. 8A and 8B.

The swirl tube-based design of the main body portion 65 serves to create an even pressure distribution in the intake portion 63. This is achieved by forming this fast vortex flow (gas cyclone), i.e. by impressing a swirl on the extracted gas volume.

The gas discharge portions 67A, 67B each have a diameter adjusting portion 81 and a tube portion 83. Each of the diameter adjusting portions 81 fluidly connects one end of the cylindrical cavity 73 in the direction of an axis of symmetry S (which is exemplarily parallel to the longitudinal axis of the intake opening 68) with an internal volume 83A of the tube portion 83 via a duct 85 tapering conically in the direction of the tube portion 83.

In the transition region between the cavity 73 and the duct 85, a special structural design of the wall transitions is provided. As can be seen in FIG. 6, in the area of the diameter increase on the side of the first diameter Dh1, the inner wall surface 65A of the main body portion 65 transitions smoothly into an inner wall surface 81A of the diameter adjusting portion 81.

In contrast, in the region of the increase in diameter on the side of the second diameter Dh2, the inner wall surface 65A of the main body portion 65 transitions into the inner wall surface 81A of the diameter adjusting portion 81, for example, with a rounded transition surface or a non-vertical step. In the design shown as an example in FIG. 6, a step side surface 87 is formed in the area of the increase in diameter on the side of the second diameter Dh2, which extends in a radial direction R starting from the increase in diameter first over the difference between the second diameter Dh2 and the first diameter Dh1 and is connected, e.g., with rounded transitions, to the inner wall surface 65A and the inner wall surface 81A. For example, an edge 89, which occurs in the transition from the step side surface 87 to the inner wall surface 81A of the diameter adjusting portion 81, may be rounded. As the distance from the increase in diameter increases, the step surface 87 becomes narrower in the radial direction R. In general, gas entering the cavity 73 will flow along the step side surface 87 in the edge region, causing vortex formation in the edge region as well.

The step side surface 87 is an example of an intermediate face connecting the inner wall surface 65A of the main body portion 65 with the inner wall surface 81A of the diameter adjusting portion 81. In particular, the step side surface 87 is an example of a stepped surface joint. In alternative embodiments, the intermediate face can be formed as an angled, curved or straight stepped surface. In particular, a transition region between the intermediate face and the inner wall surface 65A and/or a transition region between the intermediate face and the inner wall surface 81A can thus be formed without edges and/or with rounded edges/angles/transitions. In general, preferably in the transition region between the cavity 73 and the duct 85, there should be no sharp edges where powder could accumulate.

In the conical embodiment of the diameter adjusting portion 81 shown as an example, an input diameter Dke of the duct 85 on the side of the main body portion 63 on both sides of the increase in diameter corresponds to the first diameter Dh1. In contrast, an exit diameter Dka of the duct 85 on the side of the tube portion corresponds to a (tube inner) diameter Dr of the inner volume of the tube portion 67A, 67B.

In FIG. 6 the axis of symmetry S, which is assigned to the exit diameters Dka as an example, is drawn as a dotted line. The previously mentioned radial direction R refers to this axis of symmetry S as an example, whereby the helix-like shape of the main body portion 63 is not characterized by axial symmetry.

The gas discharge portions 67A, 67B, especially the tube portions 83, are fluid-connected to a filter of the gas circulation system 41 and to a suction pump.

As shown in FIGS. 5 and 6, the two gas discharge portions 67A, 67B of the exemplary symmetrically configured collector element 61" join in the central area of the main body portion 65 and are fluid-connected to the other components of the gas circulation system 41 by means of a collecting duct (not shown).

In some embodiments, a width of the inflow duct 69 is approximately 1.5 times the substrate plate diameter. The height of the inflow duct 69 defines the desired flow velocity.

Examples of useful dimensions of the different structural features include an inflow duct 69 in a rectangular shape of 8 mm×350 mm (height in Z-direction times width in X-direction) or of 10 mm×450 mm, in the area of step 78 a diameter Dh1 of approx. 30 mm and a diameter Dh2 of approx. 40 mm and a diameter Dr of the inner volume of the tube portion 67A of approx. 80 mm.

The homogeneous pressure distribution and, thus, velocity distribution along the main body portion 63 of the swirl tube-based collector element 61" is, for example, at a ratio of approx. 0.9 (preferably 0.95) of maximum velocity and minimum velocity; in general, the ratio minimum velocity/maximum velocity is preferably less than or equal to 0.9 (e.g. approx. 0.95).

According to the flow patterns shown in FIGS. 8A and 8B, extraction/suction is performed without flow-reduced or flow-free areas (blind spots) where powder, for example, could accumulate. It can be seen in FIG. 8B in particular that a uniform inflow is formed along the intermediate element 70 into the inflow duct 69.

With regard to a preferably step-free transition of the inner wall surface 65A of the main body portion 65 to the inner wall surface 81A of the diameter adjusting portion 81 in the area of the increase in diameter on the side of the first diameter Dh1, the skilled person will acknowledge that smaller elevations or smaller steps, e.g., those arising in the manufacturing process, can still represent an essentially step-free transition. The skilled person will acknowledge that an essential aspect of a transition, particularly a step-free transition, is the avoidance of areas where flow conditions exist that can lead to an accumulation of powder, which is detrimental to the manufacturing process.

Other Embodiments

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

It is to be understood that while the new systems and methods have been described in conjunction with the detailed description thereof, the foregoing description is intended to illustrate and not limit the scope of the disclosure, which is defined by the scope of the appended claims. Other aspects, advantages, and modifications are within the scope of the following claims.

What is claimed is:

1. A collector element of a gas circuit of a manufacturing device for additive manufacturing of three-dimensional components from a powder, comprising:
   an intake duct portion with a strip-shaped inflow duct having an intake opening, wherein the intake opening extends along a longitudinal axis;
   a main body portion with a cylindrical cavity with a rounded wall, wherein the cavity extends along the intake duct portion, wherein the cavity is fluidly connected to the inflow duct in a manner that there is a step in the rounded wall that causes an increase in diameter from a first diameter of the cavity to a second diameter, which is larger than the first diameter; and
   a first gas discharging portion with a diameter adjusting portion and a tube portion, wherein the diameter adjusting portion fluidly connects a first end of the cylindrical cavity in the direction of the longitudinal axis with an inner volume of the tube portion via a duct,
   whereby in a transition region between the cylindrical cavity and the duct in the region of the increase in diameter on the side of the first diameter, an inner wall surface of the main body portion transitions into an inner wall surface of the diameter adjusting portion, and
   in the region of the increase in diameter on the side of the second diameter, the inner wall surface of the main body portion transitions into the inner wall surface of the diameter adjusting portion via an intermediate face.

2. The collector element of claim 1,
   (i) wherein the diameter adjusting portion fluidly connects the first end of the cylindrical cavity in the direction of the longitudinal axis with the inner volume of the tube portion via a continuously tapering duct, in the direction of the tube portion, or
   (ii) wherein the diameter adjusting portion is formed as a substantially step-free fluid connection, or
   (iii) wherein in the region of the increase in diameter on the side of the first diameter, the inner wall surface of the main body portion transitions substantially step-free into an inner wall surface of the diameter adjusting portion, or
   (iv) any two or more of (i), (ii), or (iii).

3. The collector element of claim 2, wherein, the continuously tapering duct tapers conically or approximately conically.

4. The collector element of claim 1,
   wherein the intermediate face is a stepped surface joint from the inner wall surface of the main body portion into the inner wall surface of the diameter adjusting portion, and wherein the surface joint is stepped, perpendicular, or at an angle, and wherein the surface joint is curved or straight, and
   (i) wherein a transition region between the intermediate face and the inner wall surface of the main body portion is formed without edges or with a rounded edge; or
   (ii) wherein a transition region between the intermediate face and the inner wall surface of the diameter adjusting portion is formed without edges or with a rounded edge; or
   (iii) both (i) and (ii).

5. The collector element of claim 1, wherein the inner wall surface of the main body portion directly transitions into an inner wall surface of the diameter adjusting portion.

6. The collector element of claim 1, wherein the intake duct portion includes a top plate and a bottom plate between which the inflow duct is formed in a plate-shaped shape, and the intake opening on one side of the inflow duct is formed as a linear strip-shaped opening.

7. The collector element of claim 1, wherein in the region of the increase in diameter on the side of the second diameter, a step side surface extends in a radial direction starting from the increase in diameter first over the difference between the second diameter and the first diameter, which, in a radial direction, becomes narrower with increasing distance from the increase in diameter, and wherein an edge of the transition of the step side surface into the diameter adjusting portion is rounded.

8. The collector element of claim 1, wherein the intermediate face is configured to guide gas entering the cavity along the intermediate face to form a vortex flow.

9. The collector element of claim 1, wherein the intermediate face and the step side surface are configured to guide gas entering the cavity along the intermediate face to form a vortex flow.

10. The collector element of claim 1, wherein the intake duct portion extends on the side of the increase in diameter with a curvature transverse to the longitudinal axis, and the curvature causes an inflow of extracted gas tangentially to the inner wall of the main body portion in the region of the increase in diameter on the side of the second diameter, so that extracted gas is guided with a swirl about the longitudinal axis through the cavity and the duct into the tube portion.

11. The collector element of claim 1, wherein an input diameter of the duct on the side of the main body portion on both sides of the diameter increase corresponds to the first diameter.

12. The collector element of claim 1, wherein an exit diameter of the duct on the side of the tube portion corresponds to the diameter of the inner volume of the tube portion.

13. The collector element of claim 1, further comprising a second gas discharging portion having a second diameter adjusting portion and a second tube portion that are the same size and shape as the corresponding diameter adjusting portion and tube portion in the first gas discharging portion.

14. The collector element of claim 13, wherein the tube portion of the first gas discharging portion and second tube portion of the second gas discharging portion are combined in a collecting tube in the region of the main body portion.

15. A manufacturing device for additive manufacturing of a three-dimensional component from a powder, comprising:

a manufacturing chamber providing a work surface, wherein the manufacturing chamber includes a building platform region and a powder reservoir region;

a pushing device for transferring the powder from the powder reservoir region to the building platform region; and a gas circulation system for providing a surface flow flowing over the work surface, wherein the gas circulation system comprises a collector element of claim 1, wherein the collector element is connected to a pump, and wherein the collector element is arranged on the work surface or is fluid-connected to the manufacturing chamber via an intermediate element in such a manner that the suction opening of
  (i) the collector element at a border of the building platform region, or
  (ii) the powder reservoir region, or
  (iii) both (i) and (ii),
extracts gas out of the manufacturing chamber.

16. The manufacturing device of claim 15, further comprising:

a protective glass through which radiation from a radiation source is irradiated to generate a beam for irradiating the powder in the building platform region for layer-by-layer manufacture of the component, wherein a further collector element is arranged in the manufacturing chamber in such a manner that the intake opening of the collector element is positioned at a border of the protective glass for extracting gas from the region of the protective glass or is fluidly connected via an intermediate element for extracting gas out of the region of the protective glass.

* * * * *